UNITED STATES PATENT OFFICE.

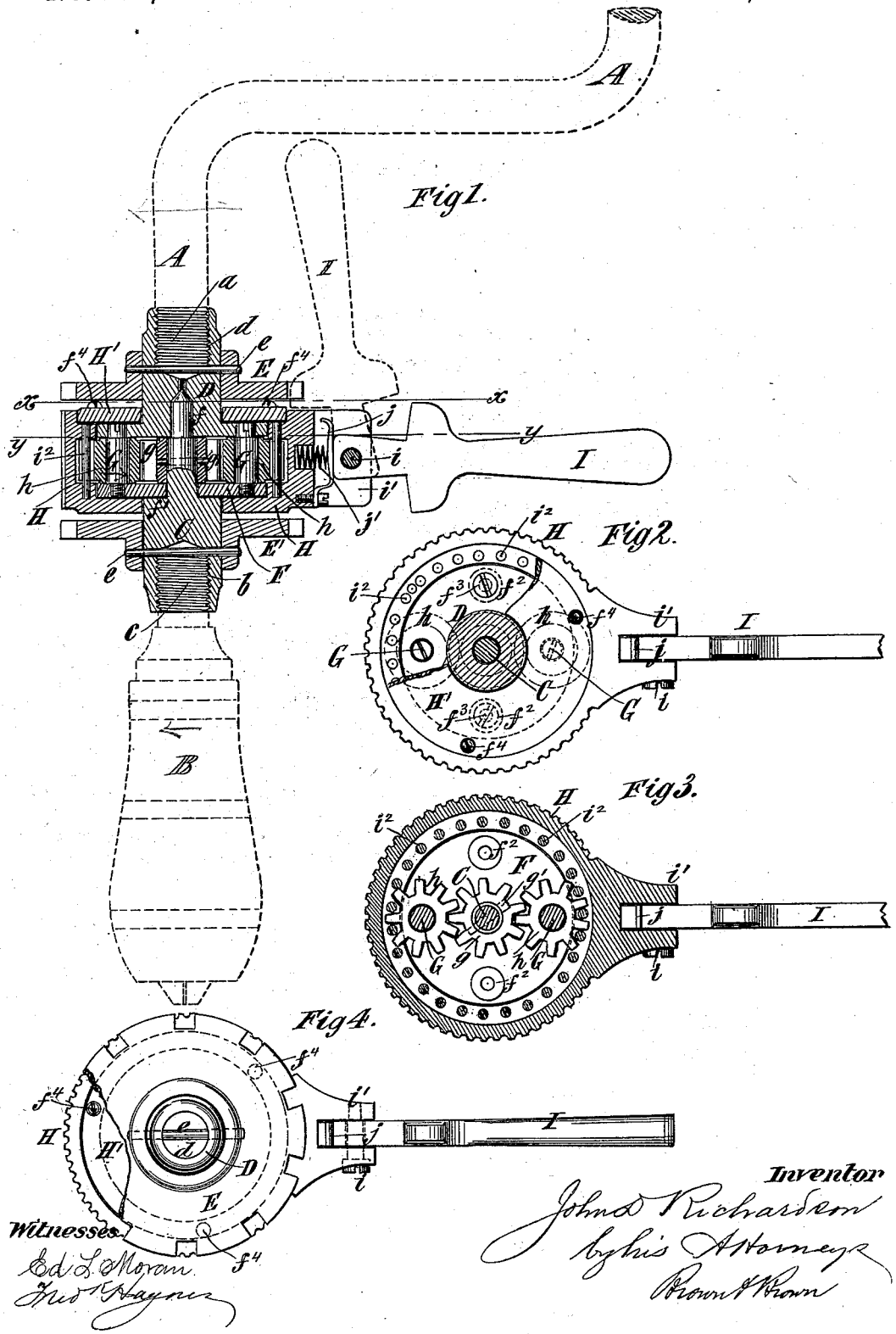

JOHN D. RICHARDSON, OF BROOKLYN, ASSIGNOR OF ONE-HALF TO FRANCIS L. MANCHESTER, OF NEW YORK, N. Y.

TOOL-STOCK.

SPECIFICATION forming part of Letters Patent No. 268,284, dated November 28, 1882.

Application filed August 21, 1882. (No model.)

*To all whom it may concern:*

Be it known that I, JOHN D. RICHARDSON, of Brooklyn, in the county of Kings and State of New York, have invented a new and useful Improvement in Tool-Stocks, of which the following is a specification.

My invention relates to the kind of devices which may be employed in connection with a brace or embodied in an article having any other form of handle, and which comprises a tool holder or socket and serves to multiply the speed of rotation of the brace or handle in transmitting motion to the tool or to decrease the speed in transmitting motion to the tool, and thus increase the force exerted by the tool.

The invention consists in novel combinations of parts in a device of the kind above described, which are hereinafter fully described.

In the accompanying drawings, Figure 1 represents a longitudinal section of a device embodying my invention and adapted to be used in connection with a brace, as shown in dotted outlines. Figs. 2 and 3 represent horizontal sections on the dotted lines $xx, yy$, Fig. 1, respectively; and Fig. 4 represents a plan of my device with a portion broken away.

Similar letters of reference designate corresponding parts in all the figures.

A designates a brace of the usual form, except that it is provided at the end with an external or male screw-thread, $a$; and B designates a chuck of a well-known construction adapted to receive small bits, drills, reamers, screw-drivers, and analogous tools.

C designates a small spindle, which is provided with a female screw-threaded socket, $b$, wherein the shank $c$ of the chuck B is screwed. The spindle constitutes in effect a tool-holder, and may be so considered, even though the chuck B is here interposed between it and the tool, for the same advantages would result if the tool were screwed directly into the socket $b$, as it might be if it were provided with a screw-thread.

D designates a second short spindle, which constitutes a driving-spindle, and is provided with an internally-screw-threaded socket, $d$, adapted to receive the screw-threaded end $a$ of the brace A.

Preferably the sockets $b\ d$ are of the same size and provided with similar screw-threads, so that, if desired, the attachment may be reversed and the holder C constitute a driving-spindle, while the spindle D would constitute a tool-holder.

E E' designate two notched disks, of the form best shown in Fig. 4, which are secured, by pins $e$ or otherwise, one to the spindle D and the other to the tool-holder C. The upper part of the tool-holder C is of small diameter, and enters a socket or hole, $f$, in the spindle D, whereby the two parts are maintained concentrically, and upon the smaller part of said holder is fixed a small pinion, $g$, which is secured by a pin, $g'$, passing through it and said holder, as best shown in Fig. 1.

F designates a washer fitting loosely on the smaller part of the tool-holder C, between a shoulder, $f'$, thereon and the under side of the pinion $g$, and on the upper side of this washer are upwardly-projecting posts $f^2$, to which the flange of the spindle D is secured by screws $f^3$. Consequently it will be seen that the spindle D and washer F are adapted to rotate together.

G designates screws extending between the washer F and the flange of the spindle D, and which are screwed into said washers, and having their heads projecting through holes in said flange, thereby connecting them with the spindle D, as best shown in Fig. 1. The screws G form journals for two planetary pinions, $h$, which gear into the pinion $g$, and are adapted to rotate freely on said screws.

H designates a ring or hollow hub, inclosing the parts above described, and fluted or otherwise roughened on the exterior, as shown, so that it may be readily grasped in the hand. The hub or ring H projects under the washer F, and its upper side is closed by a cap, H', overlapping the flange of the spindle D, and secured to the ring or hub by screws $f^4$. The pinions $g\ h$ and the gear H constitute a train of wheel-work.

I designates a locking-lever secured by a pin or pivot, $i$, in a lug or ear, $i'$, projecting from the ring or hub H, and adapted to be swung in either direction, so as to engage with the notches of the disk E, as shown in dotted lines in Fig. 1, or with the notches of the disk E'.

Bearing upon the inner end of the locking-lever I is a plate or presser, $j$, which is actuated by a spring, $j'$, and the inner end of the lever is so formed that the said plate or spring-actuated presser will hold the lever in the position shown in full lines in Fig. 1, or in the position shown in dotted lines when the lever is so adjusted.

The ring or hub H constitutes an internal gear, and, as here represented, its teeth are formed by a circular series of pins, $i^2$, after the manner of a lantern-wheel, and the pinions $h$ engage with the teeth $i^2$, as well as with the pinion $g$.

The operation of my attachment is as follows: If it is desired to use the brace like a simple brace, the tool making one turn to one turn of the brace, the locking-lever I is turned into the position shown in dotted lines in Fig. 1, thereby locking the disk E, which is secured to the spindle D, to the ring or hub H, and causing them both to turn with the said spindle. The pinions $h$ are now revolved bodily at the same speed that the ring or hub turns, and hence they cannot turn on their axes, and they therefore lock the pinion $g$ and the tool-holder to the hub or ring and through it to the spindle D, and cause the tool-holder and tool to turn at the same speed as the said spindle. When it is desired to multiply the speed the lever I is brought to the position shown in full lines in Fig. 1, and the hub or ring H is grasped in the hand to prevent its turning, and the brace is turned. The spindle D and washer F turn with the brace, and the planetary pinions $h$ are revolved about the center pinion, $g$, and are at the same time turned on their axes by engagement with the internal gear-teeth of the ring or hub. As here shown, each pinion has nine teeth and the internal gear has twenty-seven teeth. Consequently the pinions $h$ will turn three times on their axes in revolving once within the internal gear, and the pinion $g$ will receive these three rotations and a fourth rotation by reason of the revolution of the pinions $h$ about it. The tool-holder and tool will therefore be rotated four times at each turn of the brace. This is of great advantage in working small bits and tools where little power is required, and for unscrewing screws after they are once started. If the attachment is reversed and the part C screwed upon the brace, the action will be reversed and the brace will have to make four turns to produce one turn of the tool; and this is of advantage for working reamers and other tools which require considerable power and slow speed. Two notched disks are used, because whichever way the attachment is used the lever I should always be turned upward, where it will be out of the way, because if turned downward it might be in the way, especially if a short bit or tool were used.

Instead of two pinions $h$, one only or any number greater than two may be used.

What I claim as my invention, and desire to secure by Letters Patent, is—

1. The combination of the tool-holder C, provided with a screw-socket, $b$, and the center pinion, $g$, the driving-spindle D, provided with a screw-socket, $d$, and having connected with it the planetary pinions $h$, the internal gear, H, the notched disk E, and the locking-lever I, substantially as described.

2. The combination of the driving-spindle D and tool-holder C, having attached to them the notched disks E E', and provided with duplicate screw-sockets $b$ $d$, the central and planetary pinions, $g$ $h$, the internal gear, H, and the locking-lever I, substantially as described.

In testimony that I claim the foregoing I hereto sign my name.

J. D. RICHARDSON.

Witnesses:
FREDK. HAYNES,
ED. L. MORAN.